United States Patent [19]
Bonitz et al.

[11] Patent Number: 4,596,217
[45] Date of Patent: Jun. 24, 1986

[54] METHOD AND SYSTEM TO PREVENT KNOCKING OPERATION OF AN INTERNAL COMBUSTION ENGINE

[75] Inventors: Jörg Bonitz, Mühlacker; Robert Entenmann, Benningen; Bernhard Miller, Stuttgart; Siegfried Rohde, Schwieberdingen; Stefan Unland, Ludwigsburg; Walter Viess, Illingen, all of Fed. Rep. of Germany

[73] Assignee: Robert Bosch GmbH, Fed. Rep. of Germany

[21] Appl. No.: 727,204

[22] Filed: Apr. 29, 1985

Related U.S. Application Data

[63] Continuation of Ser. No. 585,553, Mar. 2, 1984, abandoned.

[30] Foreign Application Priority Data

Apr. 12, 1983 [DE] Fed. Rep. of Germany ....... 3313036

[51] Int. Cl.⁴ .......................................... G01L 23/22
[52] U.S. Cl. .................................. 123/425; 123/435; 123/419; 123/422; 123/416; 123/417
[58] Field of Search ............... 123/425, 435, 419, 422, 123/480, 416, 417

[56] References Cited

U.S. PATENT DOCUMENTS

| | | |
|---|---|---|
| 4,382,429 | 5/1983 | Enoshima et al. ................. 123/425 |
| 4,385,607 | 5/1983 | Honidea et al. ..................... 123/425 |
| 4,393,837 | 7/1983 | Sugihara et al. ..................... 123/425 |
| 4,445,479 | 5/1984 | Takakuwa et al. ................. 123/425 |
| 4,452,206 | 6/1984 | Horuguchi et al. ................. 123/425 |

*Primary Examiner*—Raymond A. Nelli
*Attorney, Agent, or Firm*—Frishauf, Holtz, Goodman & Woodward

[57] ABSTRACT

To prevent slow reestablishment of operating conditions which might lead to knocking of an internal combustion engine if the internal combustion engine operates under transient conditions, for example under conditions of rapid acceleration, the reestablishment rate of an operating control signal, for example ignition timing which, after retardation, is again advanced, transient speed changes are sensed in a differentiator (17) and, if so sensed, cause reestablishment of prior operating condition at a faster rate (f3) than otherwise, normally set into the system (see f2, FIG. 2). Additionally, the reference level of a comparator which compares sensed engine vibration signals with a reference can be increased so that, due to increased engine noise, erroneous knocking signals will not be generated by the comparator. Function generators (18, 19) which provide changed reference levels or signal weighting levels as a function of the degree or characteristics of transience, are preferably provided so that the system will respond dynamically.

20 Claims, 2 Drawing Figures

METHOD AND SYSTEM TO PREVENT KNOCKING OPERATION OF AN INTERNAL COMBUSTION ENGINE

This application is a continuation of application Ser. No. 585,553, filed Mar. 02, 1984, now abandoned.

Reference to prior patents and applications, assigned to the assignee of the present invention, the disclosure of which is hereby incorporated by reference:

U.S. Pat. No. 4,133,475; U.S. application Ser. No. 419,933, filed Sept. 20, 1982, BRITSCH now U.S. Pat. No. 4,542,727, issued Sept. 24, 1985; U.S. application Ser. No. 410,629, filed Aug. 23, 1982, BONITZ, now U.S. Pat. No. 4,478,068, Oct. 23, 1984; and U.S. Pat. No. 4,133,475, HARNED et al.

The present invention relates to a system and method to prevent knocking operation of an internal combustion engine, and more particularly to control an antiknock system to operate in accordance with desired engine characteristics even under transient engine operating conditions.

BACKGROUND

Various types of systems to prevent knocking operation of an internal combustion engine (ICE) are known, see for example the referenced U.S. Pat. No. 4,133,475, HARNED as well as the referenced applications Ser. No. 410,629, filed Aug. 23, 1982, BONITZ, now U.S. Pat. No. 4,478,068, and Ser. No. 419,933, filed Sept. 20, 1982, BRITSCH, the latter two being assigned to the assignee of the present application, and the disclosure of which is hereby incorporated by reference.

The control systems described in the referenced patents control the operation of an ICE in such a manner that knocking operation is prevented. This control can be accomplished by either setting the ignition instant to delayed or retarded point, controlling change in the fuel-air composition, or, otherwise, controlling the operating parameters of the engine. The systems of the references are so arranged that, if knocking operation is sensed, the engine operating conditions are changed until no knocking is sensed anymore; after a predetermined period of time has elapsed in which the engine operates under non-knocking conditions, the engine operating parameters are again changed so that the engine will operate under its best or most efficient operating conditions, which may be just below the knocking level. The resetting of the engine operating conditions is carried out, as described, in small steps, until the conditions under which the engine should be operated again have reached those which are set by an engine controller, for example. Signal processing of knocking signals sensed by a knock sensor is preferably carried out by comparison with a reference signal, see for example the referenced U.S. Pat. No. 4,478,068. The ignition timing can be changed, but other engine operating parameters which affect engine knocking may likewise be modified. For example, if knocking operation is sensed, the fuel-air ratio can be changed to a richer mixture, if the engine is of the fuel injection type, the injection instant can be changed or, for example, if it includes a turbo supercharger, the turbo pressure can be lowered. Other changes in the operating conditions may also be made, for example addition or injection of additional substances to increase the knocking resistance of the fuel-air mixture; the exhaust gas recirculation (EGR) system can also be modified.

The operation of an ICE is set, for example by an engine or vehicle computer, for most efficient and efficacious operation. If knocking is sensed, and the operating conditions changed, it is desirable to return to the preset or precomputed operating conditions as soon as possible, which is done in accordance with the systems described in the referenced patent and applications, in small steps. The return to normal operating conditions should be such that the effect on operating performance of the engine is gentle and does not introduce jolts or jars. The change in operating condition is commanded in the same direction, for example as a function of engine speed and/or intensity of sensed or incipient knocking.

It has been found that under transient conditions of operation of the ICE, for example under conditions of rapid acceleration, rapid change in loading or the like, return to normal operating conditions in small steps is too slow. The return to normal operating conditions, if stationary or quasi-stationary parameters have changed, is appropriate; under transient conditions, however, the desired or ideal value of the function which was modified, for example ignition timing, can be changed too much, or too fast, so that slow, stepwise return to the initial value is not desirable, since the engine will operate for a considerable period of time under less than ideal or commanded conditions.

THE INVENTION

It is an object to so improve an engine knocking control system that transient conditions can be recognized, and any modifications of engine operation is changed rapidly back to "normal" operating conditions if the knocking operation is due only to transient conditions.

Briefly, transient conditions are recognized, for example by differentiating characteristics operating signals derived during operation of the engine, for example speed signals, loading signals and the like; if a transient condition is so recognized, the change in return to normal operating conditions is commanded to occur at a rate higher than if the operating conditions were not due to a transient cause, for example by increasing the frequency of steps in which the operating conditions are changed, by accelerating the change, or the like.

The system has the advantage that the "normal" operating conditions for the engine are rapidly reached if the cause of knocking was only due to a transient condition. A new final operating point can be set, matched to new conditions at a rapid rate, from which the knocking recognition circuit can, again, interfere if subsequent knocking should be sensed again. The overall engine control system, including the knocking recognition, will thus rapidly match the actual conditions under which the engine then operates, thus improving the dynamic performance of the engine as a whole, particularly when installed in a vehicle, so that the overall operation of the engine—vehicle system is improved.

In accordance with a preferred feature of the invention, the adjustment speed of a knocking recognition system is changed in dependence on a transient function, for example in dependence on acceleration. Such a system permits optimum consideration of the actual conditions, and rapid establishment of a new basic operating point as a function of operating conditions of different characteristics or intensity.

Rapid matching of the operating conditions can, with a preferred feature of the invention, also be undertaken by weighting or modifying the signal processing within the knocking signal recognition circuit as such. For example, a control or modifying factor k or a weighting factor m for forming a reference level may be affected or modified. The reference level is used, for example, to form a minimum level relating to recognition of vibrations as knocking, rather then mere engine vibrations. Under transient conditions, during which the engine noise usually rises, the reference level of a knocking recognition circuit can be changed for dynamic recognition of knocking by increasing the reference level. This, then, effectively prevents that the knocking recognition circuit erroneously recognizes knocking conditions merely because engine speed has increased as a consequence of transient operating conditions.

DRAWINGS

FIG. 1 is a schematic block diagram of an embodiment of the present invention; and FIG. 2 is a signal and timing diagram used in describing the operation of the system of FIG. 1.

DETAILED DESCRIPTION

Figure 1:
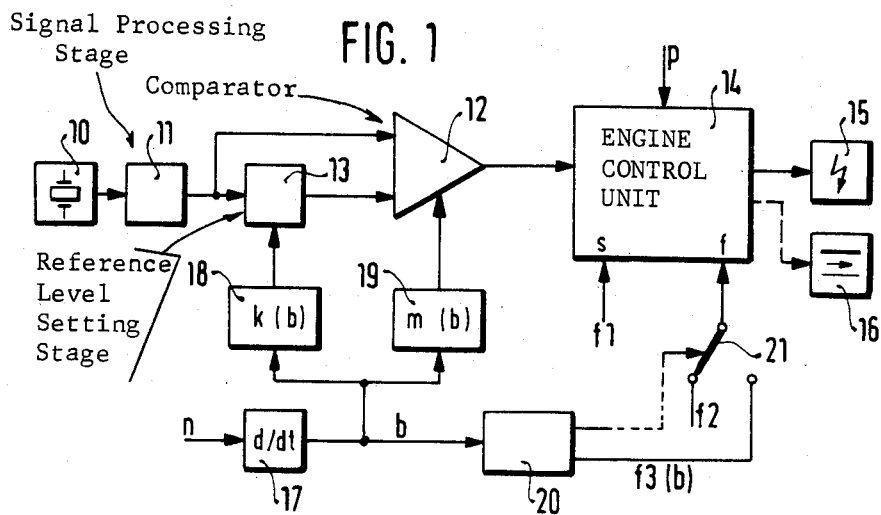

A knocking sensor 10 is connected to a signal processing circuit 11, the output of which is connected to one input of a comparator 12, and, in turn, to an input to a reference level setting stage 13. This portion of the system can be in accordance with any well-known and suitable construction or, for example, in accordance with that described in U.S. Pat. No. 4,478,068, and/or U.S. application Ser. No. 410,629, BONITZ. As described in the referenced U.S. Pat. No. 4,478,068, signals derived from the sensor element 10 are processed in stage 11 by amplification and filtering in a band pass, and then are demodulated, for example by a rectifier therein. Additionally, a control stage may be provided which forms a level value from the demodulated signal in dependence on the amplified level which controls the amplification factor of the amplifier such that, if the output signal is small, the amplification is high; and, conversely, upon high signal, the amplification is lower. Consequently, the output signal is modified to be essentially constant or level, independent of engine speed.

In accordance with a further feature and circuit structure within the signal processing stage 11, the signals are passed through a signal timing or strobing circuit to provide signals only during a predetermined time interval or window related to predetermined angular position of the crankshaft of the ICE so that the signals are processed and recognized only during the period of time when knocking would actually occur, and other stray or disturbance signals are excluded, or inhibited from being transferred through the signal processing stage. Stage 11 may be integrated into a microprocessor 14.

The reference level setting stage 13, preferably, has low-pass characteristics, and includes a transfer function having a factor k with which the actual measured knocking value is weighted to form new reference values. The reference value, which is newly determined for each measuring value derived by the knock sensor of the respective cylinder, is obtained within the microprocessor 14, operating as a digital filter, in accordance with the mathematical relationship:

$$y(t_i) = (1-k) \cdot y(t_i - 1) + k x(t_i)$$

wherein $y(t_i)$ is the then-calculated reference value, i is the count index of the ignition or combustion cycles of the respective cylinder, $x(t_i)$ is the digitized measured value derived from the signal processing stage 11, and k is a weighting factor, with which the actual measured value is weighted to form a new reference value. The factor k may be referred to as a control factor. Comparator 12, for example an operational amplifier, compares the actual measured value derived from the signal processing stage 11 with the reference value which can be dynamically obtained, and provides an output signal representative of knocking operation if the reference value from the stage 13 is exceeded by a predetermined comparison or weighting factor m.

An electrical or electronic engine control unit 14 of suitable and well-known construction is then controlled by the output signal from comparator 12 to, in turn, control engine operating command parameters. For example, unit 14 controls the ignition timing of an ignition system 15. Control unit 14, preferably, is constructed in form of a microcomputer. Alternatively, or additionally to controlling ignition timing, other functions controlling functions controlling operation of the ICE may be influenced, which, in turn, influence the knocking operation of the engine. For example, and as illustrated in FIG. 1, a fuel-air mixture control unit 16 may be controlled, for example by changing the fuel injection instant, injection period, injection pressure, or the like; other parameters may be controlled by the engine control unit 14, for example exhaust gas recirculation (EGR), injection of anti-knock substances, temperature of operation or injected or fuel-air mixture, turbo charger pressure, and the like. The control unit 14 receives the necessary engine operating parameters from an input P which may include actually measured operating data. The respective control signals for operating of the engine are then generated in accordance with well-known signal processing.

The basic operation of the system will be described in connection with modification of ignition timing. The ignition timing and, if desired, the dwell time, is controlled in dependence on a parameter P and, for example, in accordance with a stored family of curves which are accessed within the engine control unit 14, for example in dependence on the then existing speed and loading, to control the ignition timing of ignition system 15 for most efficient engine operation under the then pertaining loading and speed conditions. If this operation results in knocking conditions of the engine, an output signal will be derived from the comparator 12, which will change the ignition timing, in small steps, in the direction of ignition retardation, for example, until no knocking is recognized anymore. The spark retardation, represented by the ordinate of FIG. 2 as a crankshaft angle α will be carried out, in small steps, until the knock sensor 10 no longer recognizes knocking, which, in the embodiment of FIG. 1, means that the comparator 12 no longer provides a "knocking recognized" output signal. The change of ignition timing of stage 15 is carried out in accordance with a frequency f1 which is introduced at an input terminal s to the engine control unit. The frequency f1 can be generated, for example, within the engine control unit itself and the showing as a separate input is merely schematic. After a predetermined time has elapsed, in which no knocking conditions are sensed anymore, the desired or "normal" operating conditions which are computed by the engine control unit 14, are to be resumed, and the ignition timing is again advanced, in small steps, at a frequency f2, to advance ignition timing to the "normal" value. The frequencies f1 and f2 may be fixed frequencies or may vary in dependence on engine speed. The change of operating condition need not be applied solely to the ignition system 15, or thereto at all; other operating parameters, as noted above, may be influenced. The system, however, is designed to operate such that the operating conditions of the ICE will be controlled at a predetermined rate, smoothly or, preferably, in steps, from optimum or "normal" operating condition to one in which knocking of the engine is reliably inhibited; and, after knocking has ceased, will be again controlled at the same or a different rate (compare FIG. 2: f1 and f2) to the normal operating state or condition. Under transient conditions, the situation may occur that the resumption or return to "normal" operating conditions, governed, for example, by the frequency f2—see FIG. 2—is excessively slow.

In accordance with the present invention, a signal train n representative of engine speed is applied to a differentiating stage 17, so that the output signal from differentiating stage 17 will be a signal b which is representative of acceleration. This acceleration signal b controls three function generator 18, 19, 20. Function generator 18 modifies the control factor k; function generator 19 modifies the weighting factor m; function generator 20 modifies the frequency of return to "normal" operating conditions, for example by controlling a switch 21, as will appear.

Figure 2:
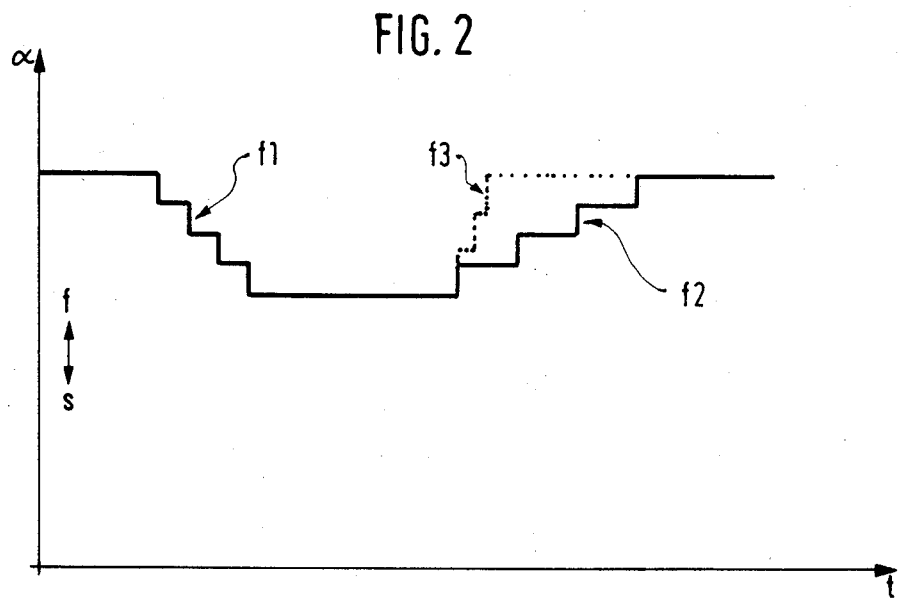

The function generators 18, 19 so modify the factors k and m that, if a transient condition, such as acceleration or rapid acceleration, or acceleration in excess of a predetermined level, is sensed, the reference value will be matched to actual measured values by change of the control factor k, and, further, by change of the level set value applied to the comparator, the factor k is stored by determining the number of shifts of the actual measured value $x(t_i)$ in a register within the microprocessor 14. This factor can be modified by, for example, sequential division by 2 as the cycle i becomes more remote in time, and thus, for example, k may have the values: 0.5, 0.25, 0.125, etc. The actual measured value $x(t_i)$ is compared in a comparator 14 with the appropriate reference value $y(t_i)$, and the comprison then determines whether the actual measured value is greater than the reference value by a predetermine difference or factor. If so, the combustion event is evaluated as knocking or pinging factor m will be changed to raise the recognition or comparison level of comparator 12 due to the higher engine noise or vibration upon acceleration. Consequently, the modification of the "normal" recognition process is changed to avoid recognition which, actually, does not occur, but which might be recognized by the comparator merely due to higher engine noise, so that, because a higher engine noise had been sensed, the time interval after initial change of engine operating conditions and return to "normal" operating conditions is increased, or extended, or prevented entirely due to continued erroneous recognition of vibration as "knocking". The function generator 20 is used to control the return speed of change in operating conditions to "normal" speed. If no acceleration is present, switch 21 which applies the frequency f2 to the engine control unit 14 is maintained in the position shown in FIG. 1. If, however, acceleration is sensed, the switch 21 changes over to the position not shown in the drawings to apply a frequency f3 to the control unit, rather than the frequency f2. As can be seen in FIG. 2, when a minimum acceleration value is sensed, the previously shifted operating value is rapidly returned to the "normal" position, as represented by the horizontal beginning and terminal lines of the graphs of FIG. 2. The resetting speed, that is, the frequency f3, may be fixed or, preferably, is dependent on acceleration conditions. In contrast to stationary or slowly changing conditions, the engine control unit thus will return the operating conditions of the engine to the initial values, thus providing for rapid adjustment of changes of operating conditions to different or changed external influences and, for example, to knocking under transient conditions.

In accordance with a preferred feature of the invention, the transient condition most easily sensed is acceleration of the engine and/or a vehicle in which it is installed. This is not the only transient condition which, however, may be used as a criterion for switch-over to rapid resetting, that is, of switch 21 from the frequency f2 to the frequency f3, as illustrated in FIG. 2; and for modifying the transfer characteristics of the signal chain from transducer 10 to the engine control unit 40, including the modification of the factors k and m. Examples for other transient conditions: change in loading, for example a sudden placement of a heavy load on the engine, e.g. simultaneous connection of a heavy lighting load and an air-conditioning load, or any other changes in loading on the engine, including changes in operating environments such as slope of a road on which a vehicle in which the engine is installed may operate, which, generally, leads to a change in operating conditions of the engine.

The system, as shown, uses function generators 18, 19, 20; the system can be simplified by replacing parameter-dependent influencing of the factors k and m by storing merely one or two fixed function values and switching-over from a given value to another one upon recognition of a transient condition. Thus, the function generators need not provide a plurality of functional output signals, depending on acceleration or acceleration rate but may merely provide one or another level, depending on the presence or absence of acceleration above or below a predetermined threshold. In such a case, the frequency f3 may be a fixed frequency or may, still, be a frequency which is derived from the speed signal n, to be still speed-dependent. Change in resumption of normal operating conditions may be obtained not only by changing the frequency but also by modifying the step pulse—step gap ratios, in addition, or in lieu of, changes in frequency, so that, for example, the curve in which the ignition system is returned to "normal" position may be similar to the curve of frequency f1.

The system has been described with reference to separate operating blocks. All the various elements shown may be integrated as a single microcomputer and, thus, may form part of an engine control unit 14. The input data necessary for modifying the return of a changed operating parameter to "normal" condition is usually already available within an engine control unit 14, so that the additional requirements for control units, such as the function generators 18, 19, 20 will be low. The variable factors k and m as well as a variable function f3 can be stored in a suitable storing location or address of a read-only memory (ROM), usually present and available within the engine control unit 14, merely requiring a few additional addresses.

Various changes and modifications may be made within the scope of the inventive concept.

We claim:

1. In combination with an internal combustion engine, a control system to minimize knocking operation while nevertheless optimizing engine performance, said control system having a knock sensor (10) providing engine operating signals which differ from each other depending upon whether the engine is operating in a knocking condition;

electrical circuit means (11, 12, 13, 14) coupled to the sensor and processing the signals, including a comparator (12) comparing the operating signals with a reference, and, if the operating signals exceed the reference, providing a knocking-recognition output signal, and an internal combustion engine (ICE) operation controller (14), connected to and controlled by the comparator (12), and providing engine control signals affecting operating parameters of the engine to operate at, or just under, the knocking limit, and to selectively shift at least one operating parameter to operate the engine under non-knocking operation conditions, said controller (14) varying said engine control signals, upon receiving a knocking recognition signal, in a non-knocking operating direction at a first rate, and, upon cessation of knocking recognition signals, re-establishing prior operating conditions by varying said engine control signals in a reverse direction at a second and slower rate than the first rate, said system comprising, in accordance with the invention, means (17) for differentiating signals representing at least one of engine speed and engine loading to determine whether said differentiated signals are in excess of a predetermined threshold, said differentiated signals in excess of said threshold defining a transient operating conditions of the engine and, if said transient operating condition is present, generating a transient recognition output signal;

said transient recognition output signal being connected and applied to said engine operation controller (14) to change the second rate of change of the engine operating control signal to a third rate, which is faster than the second rate, to re-establish pre-set operating conditions of the engine, after a transient change, at a rate greater than said second rate.

2. System according to claim 1, wherein said at least one operating control signal from the engine operation controller (14) comprises a step signal;

and wherein, in response to said transient recognition output signal, the stepping rate is accelerated with respect to said second rate.

3. System according to claim 2, wherein said accelerated stepping rate comprises furnishing said at least one operating control signal at higher steps.

4. System according to claim 2, wherein said accelerated stepping rate comprises furnishing said at least one operating control signal at a higher frequency.

5. System according to claim 3, wherein said accelerated stepping rate comprises furnishing said at least one operating control signal at a higher frequency.

6. System according to claim 1, including means (f1, f2, f3) for generating an operating control signal rate-of-change control frequency;

and wherein a transfer switch (21) is provided, operable under control of said transient operating condition recognition means (17) to apply, selectively, a frequency representative of the second rate, or of the third rate, to said engine operation controller (14).

7. System according to claim 1, wherein the rate-of-change of said at least one engine control signal is variable, and controlled as a function of the transient condition.

8. System according to claim 6, wherein the rate-of-change of said at least one engine control signal is variable, and controlled as a function of the transient condition.

9. System according to claim 1, including means (13, 18, 19) for generating a reference signal connected to said comparator (12) and providing said reference;

and wherein the transient recognition output signal (b) is coupled to said reference signal generating means to vary the reference level of said comparator as a function of recognition of a transient condition in a direction to increase the reference level above which the comparator will respond to an operating signal and furnish a knocking recognition output signal.

10. System according to claim 9, wherein the extent of variation of the reference level is a function of characteristics of the transient operating condition and variable as a function of said characteristics.

11. Method for controlling an internal combustion engine (ICE) to operate under knock-free operating conditions, in which engine control signals affecting operating parameters of the engine are generated, and, upon sensing of a knocking recognition signal, said engine operating control signal is changed to control the engine to non-knocking operating condition at a first rate and, upon cessation of the knocking recognition signal, the engine operating control signal is changed to reestablish prior operating conditions of the engine by varying the engine operating control signal in reverse direction, at a second rate, comprising the steps of recognizing transient operating conditions of the engine, which lead to knocking operation, and varying said at least one operating control signal at a third rate to reestablish operating conditions prior said transient operating condition being defined as a condition in which a derivative value, obtained by differentiating at least one of engine speed and engine loading, exceeds a predetermined threshold to reception of said knocking recognition signal at a third rate which is faster than said second rate.

12. Method according to claim 11, wherein the steps of varying the operating control signals at said respective rates comprises varying the operating control signals in steps;

and wherein the step of controlling the operating control signal at the third rate comprises changing at least one of: the frequency of the steps; the level of the steps.

13. Method according to claim 11, wherein the step of controlling the reestablishment of the operating control signal to a prior condition at a third rate comprises controlling said third rate as a function of a characteristic of the transient condition.

14. Method according to claim 11, wherein the step of generating said operating control signal includes comparing a knocking sensing signal with a reference;

and further including the step of changing the reference level upon detection of a transient condition in a direction to increase the reference level with respect to the level of the sensed signal before a knocking recognition signal is generated by said comparator if transient conditions have been detected.

15. Method according to claim 13, wherein the step of generating said operating control signal includes comparing a knocking sensing signal with a reference;

and further including the step of changing the reference level upon detection of a transient condition in a direction to increase the reference level with respect to the level of the sensed signal before a knocking recognition signal is generated by said comparator if transient conditions have been detected.

16. System according to claim 1, wherein said operating parameter of the internal combustion engine (ICE) comprises ignition spark advance, and wherein said engine control signals control the ignition timing, said controller varying said engine control signals in a direction towards lesser spark advance at said first rate upon receiving a knocking recognition signal to place the engine under non-knocking operating condition and, upon cessation of knocking recognition signals, advancing the timing of the ignition spark at a second and slower rate than said spark retardation rate, and wherein, in accordance with the invention, the transient recognition output signal changes the rate of change of spark advance at said third rate after reduction of spark advance at said first rate.

17. System according to claim 16, wherein said at least one operating control signal from the engine operation controller (14) comprises a step signal;

and wherein, in response to said transient recognition output signal, the stepping rate is accelerated with respect to said second rate.

18. Method according to claim 16, wherein the rate-of-change of said third rate of spark advance is variable and controlled as a function of the transient condition.

19. Method according to claim 10, wherein said operating parameter of the internal combustion engine comprises ignition spark advance, said engine control signals control ignition timing, said controller varying the engine control signals in direction towards lesser spark advance at said first rate upon receiving a knocking recognition signal to place the engine under non-knocking operating condition and, upon cessation of the knocking recognition signal, to reestablish prior ignition timing of the engine by advancing ignition spark timing at a second rate, wherein, in accordance with the invention, said step of varying at least one operating control signal at a third rate comprises changing the spark advance at said third rate after reduction of ignition timing advance of the spark at said first rate.

20. Method according to claim 19, wherein the step of generating said operating control signal includes comparing a knocking sensing signal with a reference;

and further including the step of changing the reference level upon detection of a transient condition in a direction to increase the reference level with respect to the level of the sensed signal before a knocking recognition signal is generated by said comparator if transient conditions have been detected.

* * * * *

UNITED STATES PATENT AND TRADEMARK OFFICE
CERTIFICATE OF CORRECTION

PATENT NO. : 4,596,217
DATED : June 24, 1986
INVENTOR(S) : BONITZ et al

It is certified that error appears in the above-identified patent and that said Letters Patent is hereby corrected as shown below:

Change column 8, lines 34-57 (claim 11) to read:

11. A method for controlling an internal combustion engine (ICE) to operate under knock-free operating conditions, in which engine control signals affecting operating parameters of the engine are generated, and, upon sensing of a knocking recognition signal, said engine operating control signal is changed to control the engine to non-knocking operating condition at a first rate and, upon cessation of the knocking recognition signal, the engine operating control signal is changed to re-establish pre-set operating conditions of the engine by varying the engine control signal in reverse direction, at a second rate, comprising the steps of recognizing transient operating conditions of the engine, which lead to knocking operation, said transient operating condition being defined as a condition in which a derivative value, obtained by differentiating at least one of engine speed and engine loading, exceeds a predetermined threshold, and varying said at least one operating control signal, to re-establish operating conditions prior to reception of said knocking recognition signal, at a third rate which is faster than said second rate.

UNITED STATES PATENT AND TRADEMARK OFFICE
CERTIFICATE OF CORRECTION

PATENT NO. : 4,596,217

DATED : June 24, 1986

INVENTOR(S) : BONITZ et al

Page 2 of 2

It is certified that error appears in the above-identified patent and that said Letters Patent is hereby corrected as shown below:

Column 5, line 38, change ", the" to --. The--.

Column 5, line 49, after "pinging", insert --;--.

Signed and Sealed this

Third Day of March, 1987

Attest:

DONALD J. QUIGG

Attesting Officer

Commissioner of Patents and Trademarks